US012613509B2

(12) United States Patent

Wagener et al.

(10) Patent No.: US 12,613,509 B2

(45) Date of Patent: Apr. 28, 2026

(54) AUTOMATIC CONFIGURATION OF REPLACED FIELD DEVICES IN AN INDUSTRIAL PLANT

(71) Applicant: ABB Schweiz AG, Baden (CH)

(72) Inventors: Dirk Wagener, Stadthagen (DE); Marcus Heege, Kaisersesch (DE); Christoph Welte, Neu-Ulm (DE); Christian Fahrenholz, Memmingen (DE)

(73) Assignee: ABB Schweiz AG, Baden (CH)

( * ) Notice: Subject to any disclaimer, the term of this patent is extended or adjusted under 35 U.S.C. 154(b) by 437 days.

(21) Appl. No.: 18/187,138

(22) Filed: Mar. 21, 2023

(65) Prior Publication Data

US 2023/0297077 A1    Sep. 21, 2023

(30) Foreign Application Priority Data

Mar. 21, 2022    (EP) ..................................... 22163182

(51) Int. Cl.
*G05B 19/4155* (2006.01)

(52) U.S. Cl.
CPC .................... *G05B 19/4155* (2013.01); *G05B 2219/33125* (2013.01)

(58) Field of Classification Search
None
See application file for complete search history.

(56) References Cited

U.S. PATENT DOCUMENTS

| | | | | | |
|---|---|---|---|---|---|
| 6,088,665 | A | * | 7/2000 | Burns | ................ G05B 19/0426 702/91 |
| 6,098,116 | A | * | 8/2000 | Nixon | ................ G05B 19/0426 710/10 |
| RE40,817 | E | * | 6/2009 | Krivoshein | ............... G06F 8/10 706/45 |
| 2007/0078540 | A1 | * | 4/2007 | Bump | .............. G05B 19/41845 700/90 |
| 2008/0274766 | A1 | * | 11/2008 | Pratt | ................... H04W 56/002 455/552.1 |

(Continued)

FOREIGN PATENT DOCUMENTS

| | | |
|---|---|---|
| CA | 2559642 A1 | 1/2008 |
| CN | 104903884 A | 9/2015 |

(Continued)

OTHER PUBLICATIONS

IEC, "International Standard 61804-2", 2006, International Electrotechnical Commission, pp. 1-12 (Year: 2006).*

(Continued)

*Primary Examiner* — David Earl Ogg

(74) *Attorney, Agent, or Firm* — Fitch Even Tabin & Flannery LLP

(57) ABSTRACT

A method for configuring a new field device in an industrial plant includes detecting the new device, obtaining driver information including configuration parameters of the new device; determining the previously used field device, determining whether the driver information for the new device matches that for the previously used device. In case of a match, provisioning the new device with the previously used configuration parameters, and in case of no match, provisioning the new device with new configuration parameters.

19 Claims, 2 Drawing Sheets

(56) References Cited

U.S. PATENT DOCUMENTS

| | | | | |
|---|---|---|---|---|
| 2008/0303472 | A1 | 12/2008 | John et al. | |
| 2011/0264244 | A1* | 10/2011 | Pettigrew | H04L 12/403 |
| | | | | 700/89 |
| 2015/0338836 | A1* | 11/2015 | Law | G05B 19/0426 |
| | | | | 700/87 |
| 2016/0291563 | A1* | 10/2016 | Kumar | H04L 67/303 |
| 2020/0103844 | A1* | 4/2020 | Victoriano | G05B 19/0426 |
| 2021/0157305 | A1* | 5/2021 | Ratilla | G05B 19/4183 |

FOREIGN PATENT DOCUMENTS

| | | | |
|---|---|---|---|
| EP | 3309632 | A1 | 4/2018 |
| EP | 3929673 | A1 | 12/2021 |
| WO | WO 2015/075615 | A1 | 5/2015 |
| WO | WO 2021/249655 | A1 | 12/2021 |

OTHER PUBLICATIONS

Wikipedia, "Device Description Language", 2015, Wayback machine, pp. 1-2 (hereinafter Wikipedia) (Year: 2015).*

NIST, "Guide to Industrial Control Systems (ICS) Security", May 2015, NIST Special Publication (SP) 800-82 Revision 2, pp. 2-10 thru 2-12 (hereinafter NIST) (Year: 2015).*

Koziolek et al., "OpenPnP: A Plug-and-Produce Architecture for the Industrial Internet of Things", 2019, IEEE/ACM 41st International Conference on Software Engineering, pp. 131-139 (Year: 2019).*

Koziolek et al., "OpenPnP: A Plug-and-Produce Architecture for the Industrial Internet of Things," *2019 IEEE/ACM 41st International Conference on Software Engineering: Software Engineering in Practice (ICSE-SEIP)*, IEEE, 131-140 (May 27, 2019).

European Patent Office, Extended European Search Report in European Patent Application No. 22163182.3, 10 pp. (Sep. 7, 2022).

China National Intellectual Property Administration, Office Action in Chinese Patent Application No. 202310270811.2, 15 pp. (Sep. 22, 2025).

* cited by examiner

AUTOMATIC CONFIGURATION OF REPLACED FIELD DEVICES IN AN INDUSTRIAL PLANT

CROSS-REFERENCE TO RELATED APPLICATIONS

This patent application claims priority to European Patent Application No. 22163182.3, filed on Mar. 21, 2022, which is incorporated herein in its entirety by reference.

FIELD OF THE DISCLOSURE

The present disclosure relates to the configuration of field devices in industrial plants that are to replace previously used field devices.

BACKGROUND OF THE INVENTION

Industrial plants for executing industrial processes comprise a plurality of field devices that are connected to a distributed control system, DCS, via a network of the industrial plant. Field devices need to be configured before they can perform their intended function in the industrial plant. WO 2021/249 655 A1 discloses a method to configure a field device based on an OPC UA server of an already configured field device of the same type.

When a field device needs to be replaced by a new one temporarily (for maintenance of the field device) or permanently (if the field device is broken), the new field device very frequently needs to be configured manually.

BRIEF SUMMARY OF THE INVENTION

In a general aspect, the present disclosure at least partially automates the configuration of a new field device that replaces a previously used field device in the industrial plant.

The disclosure describes a computer-implemented method for configuring a new field device in an industrial plant that replaces a previously used field device in the industrial plant.

The method starts with detecting that the new field device is connected to a network of the industrial plant. This may be done in any suitable manner. For example, a user, such as a plant operator, may enter the new field device in a database of field devices. But any suitable automatic method may be used as well.

Driver information and/or software for the new field device is obtained. This driver information and/or software allows communication with the new field device and is indicative of which configuration parameters of the new field device may be set, and how. For example, the driver information may comprise a list of names of configuration parameters, and optionally information regarding which type of value (such as strings, integer values in a particular numeric range, or Boolean variables) can be written into each configuration parameter. The driver information may also comprise instructions how to write a given value to a given parameter, and/or a driver software may provide an API call for writing a value to a parameter.

The previously used field device is determined. This is the field device that is to be replaced by the new field device. For example, the plant operator may flag the old field device as non-functional in the database of field devices. But any suitable automatic method may be used as well. The new field device may, for example, take the place of the previously used field device in the sense that it is mounted in the same location as the previously used field device. But it may also be mounted in a different location. The new field device only needs to provide, to the industrial plant as a whole, the functionality that the previously used field device previously provided.

It is determined whether the driver information and/or software for the new field device matches the previously used driver information and/or software for the previously used field device. If this is the case, i.e., if the old field device has been replaced by an identical new one of the same model and version, then the new field device is provisioned with the previously used configuration parameters for the previously used field device. That is, all configuration parameters of the new field device may be set to the values that are still on file for the previously used field device. Even without knowing any details about the semantic meanings of the configuration parameters, copying over all configuration parameters makes the new field device behave in exactly the same manner as the previously used field device.

But this is not the normal case in an industrial plant. Because field devices have a service life that is much longer than the innovation cycle for updates and upgrades, and the service life may be extended further by repairs, it is quite common that an identical copy of the previously used field device is no longer available at the time where this field device finally fails. This means that a different field device will need to be configured to take over the functionality of the previously used one.

To this end, an instance of a configuration for the new field device is created from device description information of the new field device. In particular, such device description information may comprise an Electronic Device Description, EDD, and/or a Device Package, DP, of the new field device. EDDs and DPs are industry standards for describing the functionality of field devices. However, these standards do not yet guarantee that one and the same parameter may be written to every field device in the same manner. In particular, names of parameters are not standardized. Rather, every manufacturer of field devices is free to assign names in any manner he deems fit. For example, a pressure set-point may be named "pset" in one field device, "set-p" in another and "p-set-bar" in a third.

Therefore, semantic meanings of new configuration parameters in the newly created instance of the configuration are determined. Likewise, semantic meanings of previously used configuration parameters for the previously used field devices are determined. This may be done by using lookup tables, or by any other suitable form of analysis. In the example mentioned above, all three names for the pressure set-point would resolve to the common semantic meaning "pressure set-point".

If the semantic meaning of a new configuration parameter matches the semantic meaning of a previously used configuration parameter, then the value of this new configuration parameter is set to the value of this previously used configuration parameter. That is, the value of the previously used configuration parameter that is still on file for the previously used field device is re-used in the newly created configuration for the new field device. Herein, "on file" may, in particular, comprise an offline data set (persistence storage) of a management system where configuration parameters are stored in association with field devices.

After the values of the configuration parameters have been set in this manner, the new field device is provisioned with the new instance of the configuration.

It is not required, and also not probable, that all values of the new configuration parameters will be filled with corresponding values from the previously used configuration parameters. For example, newer versions of field devices and/or corresponding drivers tend to have more functionality than old versions, so they offer configuration parameters for which there is no counterpart in the previously used field device. Also, old functionality that is no longer needed may be deprecated over time, so that some of the old configuration parameters have nowhere to go in the configuration of the new field device. But it can be expected that the new field device will be provisioned with at least a subset of the configuration parameters that is sufficient to get it working somehow. Every single configuration parameter of the new field device that may be automatically set saves time and counts here.

BRIEF DESCRIPTION OF THE SEVERAL VIEWS OF THE DRAWING(S)

DETAILED DESCRIPTION OF THE INVENTION

Figure 1:
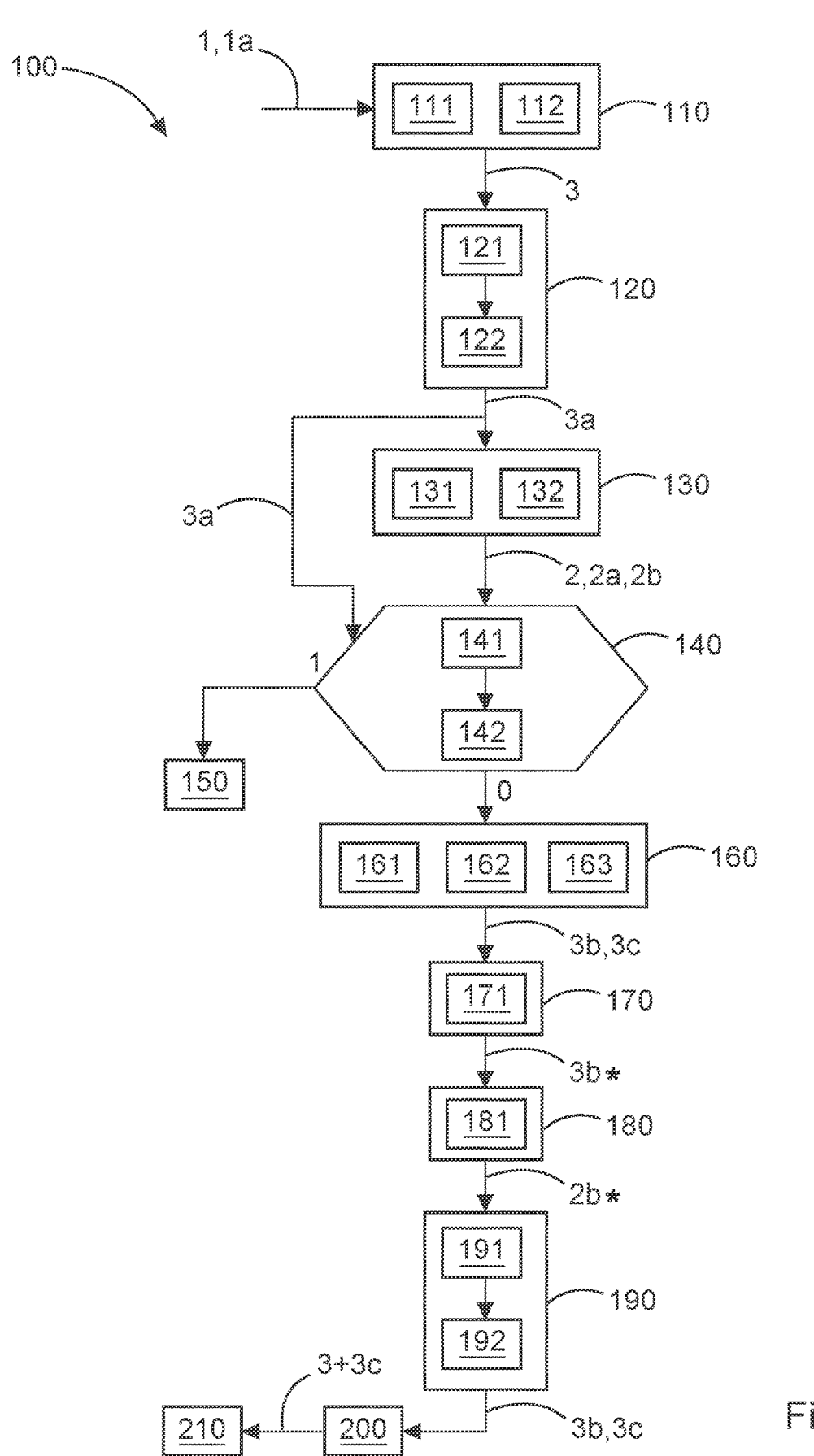
FIG. 1 is a flowchart for a method for configuring a new field device in accordance with the disclosure.

FIG. 1 is a schematic flow chart of an embodiment of the method 100 for configuring a new field device 3. This field device 3 is to replace a previously used field device 2 in an industrial plant 1.

In step 110, it is detected that the new field device 3 is connected to a network 1a of the industrial plant 1.

According to block 111, the detecting may comprise listening for discovery requests broadcasted by the new field device 3 on the network 1a. According to block 112, the detecting may comprise scanning and/or probing the network 1a for newly connected devices.

In step 120, driver information and/or software 3a for the new field device 3 is obtained. This driver information and/or software 3a allows communication with the new field device 3 and is indicative of which configuration parameters 3b of the new field device 3 may be set, and how.

According to block 121, the obtaining of driver information and/or software 3a may comprise determining an identifier of the new field device 3. According to block 122, based on this identifier, the driver information and/or software 3a may be obtained from at least one library of driver information and/or software.

In step 130, the previously used field device 2 is determined. This is the field device that is to be replaced by the new field device 3.

According to block 131, this determining may comprise detecting that a previously used field device 2 is no longer reachable on the network 1a. Alternatively or in combination to this, according to block 132, it may be detected that the new field device 3 is connected to a network port to which a previously used field device 2 was previously connected.

In step 140, it is determined whether the driver information and/or software 3a for the new field device 3 matches the previously used driver information and/or software 2a for the previously used field device 2. If this is the case (truth value 1), in step 150, the new field device 3 is provisioned with the previously used configuration parameters 2b for the previously used field device 2.

According to block 141, the determining whether the driver information and/or software 3a for the new field device 3 matches the previously used driver information and/or software 2a may comprise determining whether the type of the new field device 3 matches the type of the previously used field device 2. According to block 142, it may then be determined whether version information of the driver information and/or software 3a for the new field device matches the corresponding version information of the previously used driver information and/or software 2a for the previously used field device 2.

If the driver information and/or software 3a for the new field device 3 does not match the previously used driver information and/or software 2a for the previously used field device 2 (truth value 0 in step 140), in step 160, an instance 3c of a configuration for the new field device 3 is created from device description information of the new field device 3. In the example shown in FIG. 1, the device description information comprises an Electronic Device Description, EDD, and/or a Device Package, DP, of the new field device 3. The creating of the instance 3c may comprise: setting values of configuration parameters 3b in the instance 3c to default values given by the EDD and/or the DP, according to block 161; and/or setting values of configuration parameters 3b in the instance 3c to values given in a template configuration stored in association with the type of the new field device 3, according to block 162; and/or setting values of configuration parameters 3b in the instance 3c to values obtained from an engineering system of the industrial plant 1, according to block 163.

In step 170, semantic meanings 3b* of new configuration parameters 3b in the instance 3c of the configuration are determined. Likewise, in step 180, semantic meanings 2b* of previously used configuration parameters 2b for the previously used field device 2 are determined. According to blocks 171 and 181, this determining may comprise obtaining the semantic meaning 2b*, 3b* from a library where it is stored in association with the respective field device 2, 3 and with a name of the configuration parameter 2b, 3b.

In step 190, values of new configuration parameters 3b whose semantic meanings 3b* match semantic meanings 2b* of previously used configuration parameters 2b are set to the values of these previously used configuration parameters 2b.

According to block 191, at least one correspondence between a previously used configuration parameter 2b and a new configuration parameter 3b may be received from a user via a user interface. According to block 192, it may then be determined that this new configuration parameter 3b on the one hand and this previously used configuration parameter 2b on the other hand have a matching semantic meaning 3b*, 2b*.

In step 200, the new field device 3 is provisioned with the instance 3c of the configuration that has been populated with values of configuration parameters 3b as described above.

In step 210, at least one industrial process is executed on the industrial plant 1 with the participation of the new field device 3.

Figure 2:
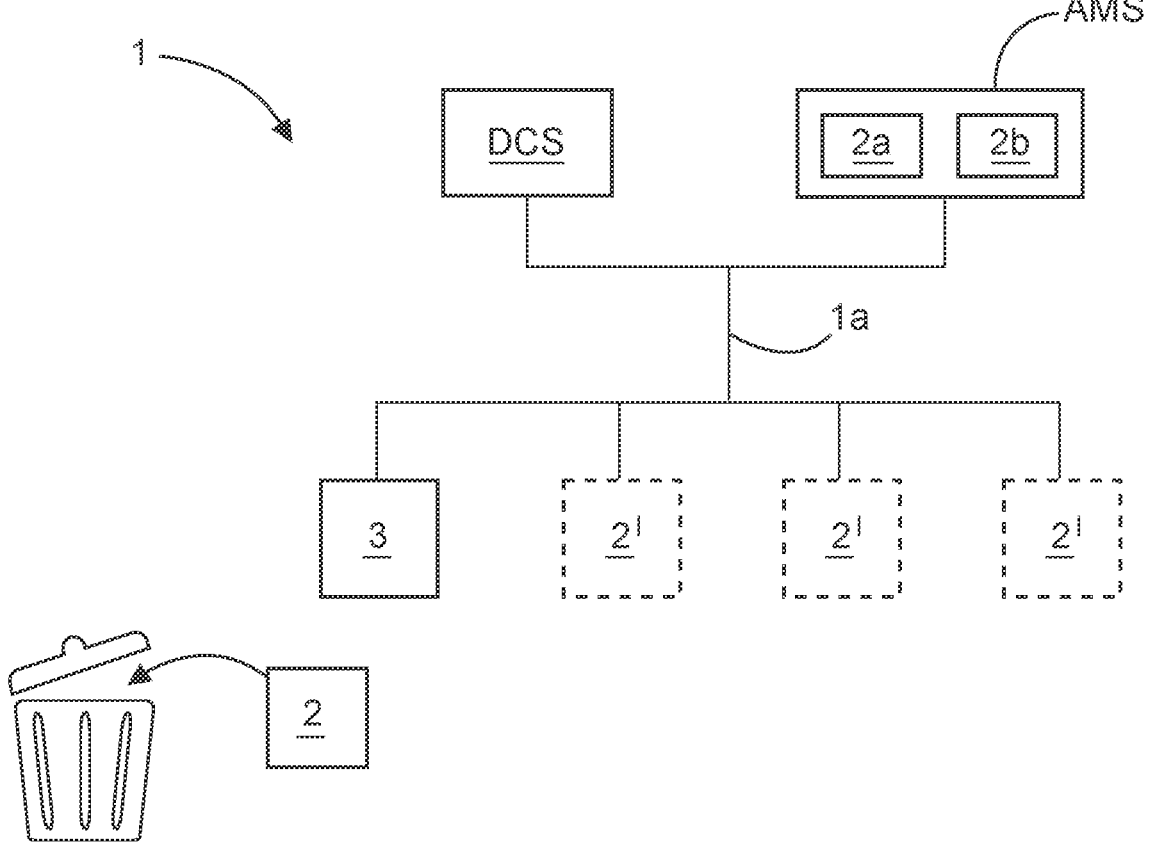
FIG. 2 is a diagram for an exemplary setting where the method shown in FIG. 1 may be employed in accordance with the disclosure.

FIG. 2 illustrates an exemplary situation where the method 100 may be used. An industrial plant 1 comprises multiple field devices 2, 2'. The field devices 2, 2', a distributed control system, DCS, and an asset management system, AMS, are connected to a network 1a of the industrial plant 1. The AMS stores driver information and/or software 2a, as well as values of configuration parameters 2b, for the field devices 2, 2'.

In the situation shown in FIG. 2, the field device 2 is broken and replaced by the new field device 3. According to the method 100, the new field device 3 can be provisioned with the previously used values of configuration parameters 2b to the extent that these are compatible with the new field device 3.

In particular, this is very valuable in situations where a field device suddenly fails. If this happens on a weekend or holiday, only a technician who knows how to replace field devices, but has no deeper knowledge about the details of the industrial process being run with the field device, might be available at short notice. This will suffice to get the industrial process going again because the new field device can be automatically configured at least partially. Fine tuning of parameters can then be performed later, when an engineer with knowledge about the industrial process is available.

In a particularly advantageous embodiment, the detecting that the new field device is connected to a network of the industrial plant may comprise listening for discovery requests broadcasted by the new field device on the network. For example, on an Ethernet network, a newly connected device may broadcast DHCP requests. Alternatively or in combination to this, the network may be scanned and/or probed for newly connected devices. For example, numeric addresses that are available in the network may be enumerated one by one to check whether a newly connected device responds.

In a particularly advantageous embodiment, to obtain driver information and/or software, an identifier of the new field device may be determined. Based on this identifier, the driver information and/or software may be obtained from at least one library of driver information and/or software. This library can be a local one, but it can also comprise a library that is accessible over a network.

In a particularly advantageous embodiment, the determining of the previously used field device may comprise detecting that a previously used field device is no longer reachable on the network. Alternatively or in combination to this, it may be detected that the new field device is connected to a network port to which a previously used field device was previously connected. If one previously used field device goes offline and one new field device is connected, and in particular if it is connected to the same network port as the previously used field device, it is very probable that the new field device is intended to replace the old one.

In a particularly advantageous embodiment, the determining whether the driver information and/or software for the new field device matches the previously used driver information and/or software for the previously used field device may comprise determining whether the type of the new field device matches the type of the previously used field device. It may then be determined whether version information of the driver information and/or software for the new field device matches the corresponding version information of the previously used driver information and/or software for the previously used field device. If both the type and the version information match, then the driver information and/or software for the new field device may be considered to match the previously used driver information and/or software, so that the previously used configuration parameters may be re-used without considering and understanding their semantic meanings.

When the instance of a configuration for the new field device is created, the configuration parameters of this instance may be populated with values from multiple sources. For example, values of configuration parameters in the instance may be set to default values given by the device description information. If there is a template configuration stored in association with the type of the new field device, configuration parameters in the instance may also be set to values given in this template configuration. In particular, these values may partially supersede the values given by the device description information, thereby including plant-specific knowledge into the instance of the configuration. Such plant-specific knowledge may also be included by setting values of configuration parameters in the instance to values obtained from an engineering system of the industrial plant.

In a further particularly advantageous embodiment, the determining of the semantic meaning of a configuration parameter may comprise obtaining the semantic meaning from a library where it is stored in association with the respective field device and with a name of the configuration parameter. In the example mentioned above, if different field devices name a pressure set-point "pset", "set-p" and "p-set-bar", the library may store the semantic meaning "pressure set-point" in association with each field device and the respective name for the pressure set-point. One way of creating and using such a library is detailed in published co-pending application EP 3 929 673 A1.

In a further particularly advantageous embodiment, at least one correspondence between a previously used configuration parameter and a new configuration parameter may be received from a user via a user interface. It may then be determined that this new configuration parameter on the one hand and this previously used configuration parameter on the other hand have a matching semantic meaning. In this manner, additional knowledge of the user with respect to correspondences between configuration parameters may be exploited.

The new field device may, in particular, be a device that is in direct physical interaction with an industrial plant, and/or with an industrial process executed on this industrial plant. In particular, the new field device may be a sensor device that is to supply at least one measurement value of a physical quantity to a distributed control system, DCS, of the industrial plant, and/or an actor device that is to enact a control command received from the DCS on the plant.

In a particularly advantageous embodiment, the method steps described so far may be performed by an Asset Management System, AMS, of the industrial plant. Such an AMS may keep values of configuration parameters for all field devices on file in offline storage, so that they are still available if a field device is replaced and the previously used field device is no longer accessible online.

In a further advantageous embodiment, the method further comprises executing at least one industrial process on the industrial plant with the participation of the new field device. In this context, the method provides the advantage that the industrial process can resume faster after the field device has been replaced with a new one.

The method is computer-implemented and can therefore be embodied in software. The invention therefore also provides computer program, comprising machine-readable instructions that, when executed on one or more computers and/or compute instances, cause the one more computers and/or compute instances to perform the method described above. In particular, process controllers, microcontrollers and other electronic devices that are able to execute machine-readable instructions may be regarded as computers as well. Compute instances comprise virtual machines, containers and any other execution environments in which machine-readable instructions may be executed. The invention also relates to a machine-readable data carrier, and/or a download product, with the computer program. A download product is a product that may be sold in an online shop for immediate fulfillment by download. The invention also provides one or more computers and/or compute instances with the one or more computer programs, and/or with the one or more machine-readable data carriers and/or download products.

LIST OF REFERENCE SIGNS 1 industrial plant
1a network of industrial plant 1
2,2' previously used field device
2a driver information/software for field device 2
2b configuration parameters of field device 2
2b* semantic meanings of configuration parameters 2b
3 new field device
3a driver information/software for field device 3
3b configuration parameters of field device 3
3b* semantic meanings of configuration parameters 3b
3c instance of configuration for field device 3
100 method for configuring new field device 3
110 detecting that new field device 3 is connected to network 1a
111 listening for discovery requests
112 scanning and/or probing network 1a for newly connected devices
120 obtaining driver information and/or software 3a
121 determining identifier of field device 3
122 obtaining driver information and/or software 3a from library
130 determining previously used field device 2
131 detecting that previously used field device 2 is no longer reachable
132 detecting that new field device 3 is connected to previous network port
140 determining whether driver information/software is unchanged
141 determining whether new field device 3 has unchanged type
142 determining whether driver information/software has unchanged version
150 provisioning new field device 3 with configuration parameters 2b
160 creating instance 3c
161 using default values from device description information
162 using values from template configuration
163 using values from engineering system
170 determining semantic meanings 3b* of configuration parameters 3b
171 obtaining semantic meanings 3b* from library
180 determining semantic meanings 2b* of configuration parameters 2b
181 obtaining semantic meanings 2b* from library
190 setting values of parameters 3b to values of corresponding parameters 2b
191 receiving correspondence between configuration parameters 2b, 3b
192 determining that semantic meanings 2b*, 3b* match
200 provisioning new field device 3 with instance 3c
210 executing industrial process with participation of new field device 3
AMS asset management system
DCS distributed control system All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-implemented method for configuring a new field device in an industrial plant that replaces a previously used field device in the industrial plant, comprising:

detecting that the new field device is connected to a network of the industrial plant;

obtaining driver information and/or software that allows communication with the new field device and is indicative of which configuration parameters of the new field device may be set, and how such configuration parameters shall be set;

determining the previously used field device which is to be replaced by the new field device;

determining whether the driver information and/or software for the new field device matches the previously used driver information and/or software for the previously used field device; and in case of a match, provisioning the new field device with previously used configuration parameters for the previously used field device, and in case of no match, provisioning the new field device with new configuration parameters by:

creating, from device description information of the new field device, an instance of a configuration for the new field device;

determining semantic meanings of the new configuration parameters in the instance of the configuration:

determining semantic meanings of the previously used configuration parameters for the previously used field device;

setting values of the new configuration parameters whose semantic meanings match semantic meanings of the previously used configuration parameters to the values of the previously used configuration parameters;

and in case of semantic meanings not matching, creating the instance of configuration of the new field device further comprises one or more of:

setting values of configuration parameters in the instance to default values given by the device description information; and setting values of configuration parameters in the instance to values given in a template configuration stored in association with the type of the new field device; and setting values of configuration parameters in the instance to values obtained from an engineering system of the industrial plant, and provisioning the new field device with the instance of the configuration.

2. The method of claim 1, wherein the device description information comprises an Electronic Device Description (EDD), and/or a Device Package (DP), of the new field device.

3. The method of claim 1, wherein the detecting that the new field device is connected to a network of the industrial plant comprises:

listening for discovery requests broadcasted by the new field device on the network; and/or scanning and/or probing the network for newly connected devices.

4. The method of claim 1, wherein the obtaining driver information and/or software comprises:

determining an identifier of the new field device; and obtaining, based on the identifier, from at least one library of driver information and/or software, the driver information and/or software.

5. The method of claim 1, wherein the determining of the previously used field device comprises:

detecting that a previously used field device is no longer reachable on the network, and/or detecting that the new field device is connected to a network port to which a previously used field device was previously connected.

6. The method of claim 1, wherein the determining whether the driver information and/or software for the new field device matches the previously used driver information and/or software for the previously used field device comprises:

determining whether the type of the new field device matches the type of the previously used field device, and determining whether version information of the driver information and/or software for the new field device matches the corresponding version information of the previously used driver information and/or software for the previously used field device.

7. The method of claim 1, wherein the determining of the semantic meaning of a configuration parameter comprises obtaining the semantic meaning from a library where it is stored in association with the respective field device and with a name of the configuration parameter.

8. The method of claim 1, wherein the setting values of new configuration parameters further comprises:

receiving, from a user, via a user interface, at least one correspondence between a previously used configuration parameter and a new configuration parameter; and determining that this new configuration parameter and this previously used configuration parameter have a matching semantic meaning.

9. The method of claim 1, wherein the new field device is a device that is in direct physical interaction with an industrial plant, and/or with an industrial process executed on this industrial plant.

10. The method of claim 9, wherein the new field device is a sensor device that is to supply at least one measurement value of a physical quantity to a distributed control system (DCS), of the industrial plant, and/or an actor device that is to enact a control command received from the DCS on the plant.

11. The method of claim 1, wherein the method is performed by an Asset Management System (AMS), of the industrial plant.

12. The method of claim 1, further comprising executing at least one industrial process on the industrial plant at least in part by the new field device.

13. A computer program, comprising machine-readable instructions stored on a tangible non-transitory storage medium that, when executed on one or more computers and/or compute instances, cause the one more computers and/or compute instances to perform a method for configuring a new field device in an industrial plant that replaces a previously used field device in the industrial plant, comprising:

detecting that the new field device is connected to a network of the industrial plant;

obtaining driver information and/or software that allows communication with the new field device and is indicative of which configuration parameters of the new field device may be set, and how such configuration parameters shall be set;

determining the previously used field device which is to be replaced by the new field device;

determining whether the driver information and/or software for the new field device matches the previously used driver information and/or software for the previously used field device; and in case of a match, provisioning the new field device with the previously used configuration parameters for the previously used field device, and in case of no match, provisioning the new field device with new configuration parameters by:

creating, from device description information of the new field device, an instance of a configuration for the new field device;

determining semantic meanings of new configuration parameters in the instance of the configuration;

determining semantic meanings of previously used configuration parameters for the previously used field device;

setting values of new configuration parameters whose semantic meanings match semantic meanings of previously used configuration parameters to the values of these previously used configuration parameters;

in case of semantic meanings not matching, creating the instance of configuration of the new field device further comprises one or more of:

setting values of configuration parameters in the instance to default values given by the device description information; and setting values of configuration parameters in the instance to values given in a template configuration stored in association with the type of the new field device; and setting values of configuration parameters in the instance to values obtained from an engineering system of the industrial plant, and provisioning the new field device with the instance of the configuration.

14. The computer program of claim 13, wherein the device description information comprises an Electronic Device Description (EDD), and/or a Device Package (DP), of the new field device.

15. The computer program of claim 13, wherein the detecting that the new field device is connected to a network of the industrial plant comprises:

listening for discovery requests broadcasted by the new field device on the network; and/or scanning and/or probing the network for newly connected devices.

16. The computer program of claim 13, wherein the obtaining driver information and/or software comprises:

determining an identifier of the new field device; and obtaining, based on the identifier, from at least one library of driver information and/or software, the driver information and/or software.

17. The computer program of claim 13, wherein the determining of the previously used field device comprises:

detecting that a previously used field device is no longer reachable on the network, and/or detecting that the new field device is connected to a network port to which a previously used field device was previously connected.

18. The computer program of claim 13, wherein the determining whether the driver information and/or software for the new field device matches the previously used driver information and/or software for the previously used field device comprises:

determining whether the type of the new field device matches the type of the previously used field device, and determining whether version information of the driver information and/or software for the new field device matches the corresponding version information of the previously used driver information and/or software for the previously used field device.

19. The computer program of claim 13, wherein the creating an instance of a configuration for the new field device comprises:

setting values of configuration parameters in the instance to default values given by the device description information; and/or setting values of configuration parameters in the instance to values given in a template configuration stored in association with the type of the new field device; and/or setting values of configuration parameters in the instance to values obtained from an engineering system of the industrial plant.

* * * * *